United States Patent [19]

Acs et al.

[11] Patent Number: 5,808,116

[45] Date of Patent: Sep. 15, 1998

[54] PROCESS FOR THE PREPARATION OF TRIPHENYLEMETHANE COLORING AGENTS

[75] Inventors: Arpad Acs, Oberursel; Hans-Josef Remsperger, Flörsheim; Jürgen Berger, Kriftel, all of Germany

[73] Assignee: Hoechst Aktiengesellschaft, Frankfurt, Germany

[21] Appl. No.: 570,486

[22] Filed: Dec. 11, 1995

[30] Foreign Application Priority Data

Dec. 14, 1994 [DE] Germany .......................... 44 44 472.9

[51] Int. Cl.⁶ ...................................................... C09B 11/04
[52] U.S. Cl. .............................................................. 552/103
[58] Field of Search ............................................... 552/103

[56] References Cited

U.S. PATENT DOCUMENTS

| | | | |
|---|---|---|---|
| 1,956,921 | 5/1934 | Immerheiser et al. | 260/11 |
| 3,184,483 | 5/1965 | Quint et al. | 260/393 |
| 3,211,757 | 10/1965 | Schafer et al. | 260/393 |
| 3,444,157 | 5/1969 | Tanaka et al. | 260/176 |
| 3,671,553 | 6/1972 | Papenfuss et al. | 260/392 |
| 4,477,381 | 10/1984 | Mayer et al. | 260/392 |

FOREIGN PATENT DOCUMENTS

| | | |
|---|---|---|
| 1098652 | 10/1956 | Germany . |
| 1161370 | 7/1964 | Germany . |
| 1161371 | 7/1964 | Germany . |
| 1919724 | 11/1970 | Germany . |
| 3108720 | 9/1982 | Germany . |
| 872561 | 7/1961 | United Kingdom . |

OTHER PUBLICATIONS

Chamberlain, K.A.J., et al, *BIOS Final Report No. 1433:* pp. 32–33 (undated).

*Primary Examiner*—Allen J. Robinson
*Assistant Examiner*—Barbara Badio
*Attorney, Agent, or Firm*—Connolly and Hutz

[57] ABSTRACT

Triaminotriphenylmethane pigments are prepared by a) first reacting an iron, boron or aluminum trihalide complex compound of a 4,4',4"-trihalotriphenylmethane halide with a salt of an aromatic aminosulfonic acid in a molar ratio of 0.6:1 to 1.4:1 at a temperature between 130° and 180° C., under hydrogen halide partial pressure of at least 1 bar and in the presence of a polar, water-insoluble organic solvent, subsequently b) reacting the reaction suspension obtained according to a) with at least 5 molar equivalents of an aromatic amine subsequently c) either bringing the amine melt obtained according to b), in the absence of a water-soluble solvent, to a pH of between 1 and 6 by addition of a mineral acid or first bringing it to a pH of at least 9 with an alkali metal hydroxide solution in the presence of a viscosity-lowering additive, carrying out a phase separation, adding a water-insoluble organic solvent to the organic phase and then bringing this to a pH of between 1 and 6 by addition of a mineral acid.

The pigments obtained can be processed into high-quality printing inks.

19 Claims, No Drawings

PROCESS FOR THE PREPARATION OF TRIPHENYLMETHANE COLORING AGENTS

The present invention relates to the field of triphenylmethane coloring agents.

The monosulfonic acids of triphenylmethane coloring agents have great industrial importance for the preparation of blue and especially black printing inks, for which they are employed either as pigment powders or in the form of various pigment preparations, for example flush pastes.

Triphenylmethane coloring agents produced on an industrial scale are prepared by monosulfonation of the corresponding color bases or color base sulfates in sulfuric acid at a certain concentration and temperature. The color bases which can be employed for the sulfonation are obtained by reaction of rosanilines with primary aromatic amines in the presence of acid catalysts, vacuum distillation of the volatile base contained in the finished melt at temperatures of about 150° C. and comminution of the cooled residual melt (Fierz-David, Künstliche organische Farbstoffe, 1926, page 262 and BIOS Final Report, 1433, pages 30, 31, 36) or by conversion of the color base hydrochlorides or tetrachloroaluminates, obtainable in accordance with DE-A-1 098 652, U.S. Pat. No. 3,184,483 and U.S. Pat. No. 3,211,757 by reaction of 4,4',4"-trichlorotrityl tetrachloroaluminate with bases, into the free color bases by means of treatment with alcohol and alkali metal hydroxide solution (Fierz-David, Künstliche organische Farbstoffe, 1926, page 264), or by means of treatment with alkali metal in the presence of organic bases and subsequent vacuum distillation of the color base solution (BIOS Final Report, 1433, page 32).

The color base sulfates which can likewise be employed for the monosulfonation are obtained by treatment of the color bases, dissolved in aromatic amines or in mixtures of aromatic amines and water-insoluble organic solvents, with sulfuric acid and subsequent working-up of the color base sulfate from the precipitate suspension (U.S. Pat. No. 3,671,553).

Monosulfonic acids of triphenylmethane dyestuffs are also obtainable without a separate sulfonation step if aromatic amines containing sulfo groups are employed for the preparation of the abovementioned color base tetrachloroaluminates. Although a theoretically less expensive and more environment-friendly preparation process is rendered possible by the omission of the sulfonation step, the triphenylmethane pigments obtained by this process from aromatic sulfonic acid salts (DE-A-1 098 652) or aromatic sulfonic acids (U.S. Pat. No. 4,477,381) have not yet acquired industrial and economic importance. Thus, only processes which require the use of water-soluble organic solvents, for example ethanol, pyridine, acetic acid, acetone, glycol, dimethylformamide or dimethyl sulfoxide, either during the synthesis or during working-up of the reaction product (DE-A-1 098 652, U.S. Pat. No. 4,477,381), which would be associated with a cumbersome, involved and expensive solvent regeneration in the event of industrial use, are known to date. If a water-soluble organic solvent is dispensed with in the reaction or working-up stages mentioned, the viscosity of the reaction batch increases proportionally to the degree of conversion with the aromatic amines containing sulfo groups, up to a lumpy consistency of the entire batch which can scarcely still be handled. If increasing solidification already occurs during the reaction as a consequence of the reaction of the trichlorotrityl tetrachloroaluminate with the aromatic amine containing sulfo groups, this leads to incomplete reaction with a proportion of the acid group in the end product which is markedly below that of triphenylmethane pigments sulfonated by sulfuric acid, or at least to an inhomogeneous reaction. This manifests itself in an incomplete solubility of the triphenylmethane pigment in dilute alkali metal hydroxide solution, associated with a cloudy color of the solution and a residue during filtration of the alkaline solution. Triphenylmethane pigments with such solution properties are unsuitable for preparation to give high-quality printing inks such as those given by triphenylmethane bases sulfonated with sulfuric acid. An inadequate degree of conversion furthermore leads to a poor or even completely absent elimination of water during the preparation of flush paste preparations and to a high coarse-grain content, which causes the formation of specks in the prints applied. In printing ink pastes formulated to the same tinctorial strength, the triphenylmethane pigments obtained from aromatic aminosulfonic acids or salts thereof in accordance with the prior art have drastically higher viscosities which can scarcely still be handled with the usual means for technical application.

With alkaline working-up of the amine melts, the formation of a very viscous up to an almost stone-like consistency of the batch occurs at a correspondingly high conversion if the use of water-soluble organic solvents which serve to liquefy the batch is dispensed with according to the processes known to date. The triphenylmethane pigments can be isolated from suspensions of such a consistency only with extreme difficulty, since the suspensions can be homogenized by conventional methods of working-up within an appropriate period of time only with great effort and incompletely. Direct acid working-up of the amine melts has not been described to date.

A process for the preparation of triphenylmethane pigments is therefore required which dispenses with the use of water-soluble organic solvents at all the reaction and working-up stages and at the same time delivers a suitable crude pigment grade which is distinguished by a high tinctorial strength, suitable color properties, good Theological properties and a low coarse-grain content, when used in printing inks, quality properties such as have been achievable to date exclusively via sulfonation of triphenylmethane color bases with sulfuric acid, which is adverse with regard to process technology.

It has been found that this object can be achieved, surprisingly, if the process steps described below are carried out during synthesis of the triphenylmethane coloring agent.

The invention relates to a process for the preparation of triaminotriphenylmethane coloring agents, which comprises a) first reacting an iron, boron or aluminum trihalide complex compound of a 4,4',4"-trihalotriphenylmethane halide with a salt of an aromatic aminosulfonic acid in a molar ratio of 0.6:1 to 1.4:1 at a temperature between 130° and 180° C., under a hydrogen halide partial pressure of at least 1 bar and in the presence of a polar, water-insoluble organic solvent, subsequently b) reacting the reaction suspension obtained according to a) with at least 5 molar equivalents of an aromatic amine of the formula (2)

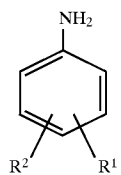

(2)

in which $R^1$ and $R^2$ are identical or different and are hydrogen, halogen, methyl, ethyl, nitro, methoxy or ethoxy, at a temperature between 130° and 180° C., subsequently c) either bringing the amine melt obtained according to b), in the absence of a water-soluble solvent, to a pH of between 1 and 6 with a mineral acid or first bringing it to a pH of at least 9 with an alkali metal hydroxide solution in the presence of a viscosity-lowering additive, carrying out a phase separation, adding a water-soluble organic solvent to the organic phase and then bringing this to a pH of between 1 and 6 by addition of a mineral acid, and finally d) isolating the coloring agent precipitated according to c) in the customary manner.

The process according to the invention proceeds in accordance with the following reaction equation, which is shown by the example of the reaction partners chlorobenzene, aluminum trichloride, 4-chlorophenyltrichloromethane, sulfanilic acid sodium salt and m-toluidine:

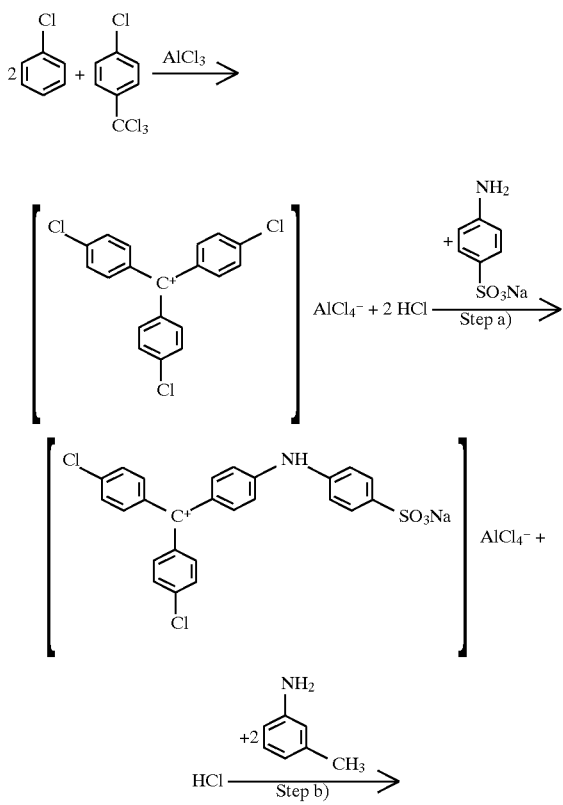

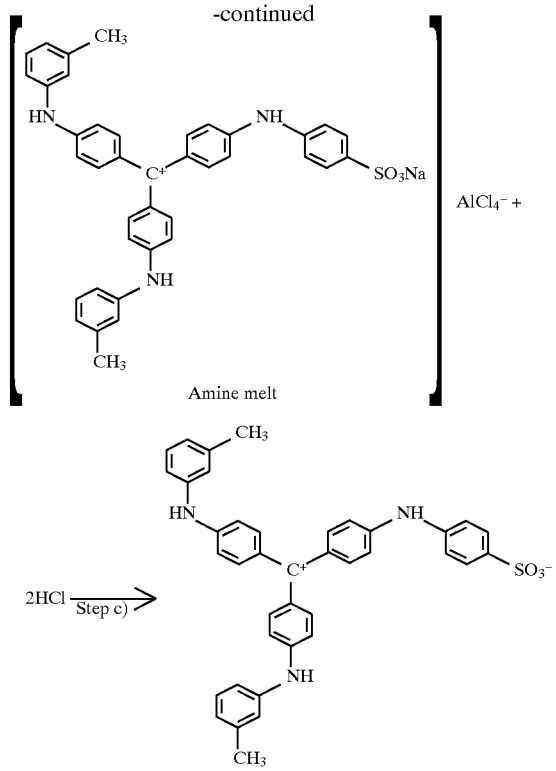

The iron, boron or aluminum trihalide complex compound of the 4,4',4''-trihalotriphenylmethane halide is prepared by customary methods with which the expert is familiar in all instances by reaction of a halobenzene with a p-halobenzotrihalide and an iron, boron or aluminum trihalide. A possible halogen in this connection is chlorine or bromine, preferably chlorine.

The complex compounds thus obtained are reacted with 0.6 to 1.4, preferably 1.0 to 1.2, molar equivalents of a salt of an aromatic aminosulfonic acid at a temperature between 130° and 180° C., preferably at 150° to 170° C., in a closed system, expediently at the autogenous increased pressure and in the presence of a moderately polar, water-insoluble organic solvent, for example chlorobenzene, dichlorobenzene, toluene, xylenes, decalin or tetralin, expediently for 1 to 6 hours, preferably about 3 hours.

Aromatic aminosulfonic acids which are of interest are, for example, metanilic acid, sulfanilic acid and β-naphthylamine-sulfonic acids, such as 2-naphthylamine-4-sulfonic acid, 2-naphthylamine-5-sulfonic acid, 2-naphthylamine-6-sulfonic acid, 2-naphthylamine-7-sulfonic acid or 2-naphthylamine-8-sulfonic acid. Possible salts of the aromatic aminosulfonic acids mentioned are alkali metal salts, alkaline earth metal salts or ammonium salts, preferably sodium salts or potassium salts, in particular sodium salts. Particularly good results are obtained if the salts mentioned are free or substantially free from water of crystallization.

The autogenous increased pressure in the temperature range mentioned is about 2 to 4 bar if the vessel is filled to 60 to 80%. The increased pressure mentioned is also caused by hydrogen halide gas formed during the reaction and is adequate for carrying out the process according to the invention. However, it is also possible additionally to force in hydrogen halide gas from the outside. It is not necessary to limit the extent of the increased pressure, but more than 6 bar is inappropriate.

After the abovementioned reaction partners and solvents have been brought together in the reaction vessel, for example an autoclave, it is expedient to apply a vacuum to just above the boiling vapor pressure of the solvent employed at a temperature of 30° to 60° C. for a period of 1 to 30 minutes before the start of the reaction, and then to carry out the reaction, after closing the autoclave, under the pressure which builds up and at the temperatures mentioned. It is particularly advantageous if the mixture is stirred in the axial direction (axial stirring distribution) at a speed of between 40 and 80, preferably 40 and 50, revolutions per minute.

The process described above and identified as step a) for the preparation of a compound of the formula (1)

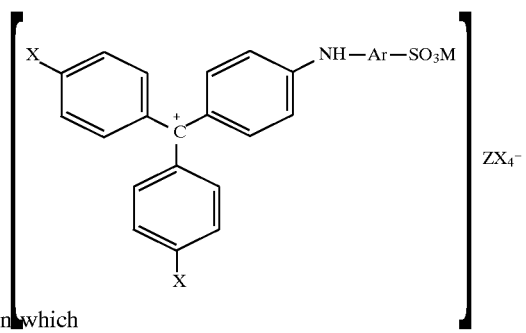

in which

X is halogen, preferably chlorine or bromine, in particular chlorine,

Z is iron, boron or aluminum,

M is an alkali metal or alkaline earth metal or an ammonium group, preferably sodium or potassium, and Ar is a phenylene or naphthylene radical, has not previously been known and the present invention likewise relates to this process. The preferred embodiments described for step a) also apply to the preparation of the compound of the formula (1).

If triaminotriphenylmethane coloring agents are to be prepared, the compound of the formula (1) is reacted in the form of the reaction suspension obtained from step a) with at least 5, preferably with 5 to 30, in particular with 7 to 15, molar equivalents of one or more aromatic amines of the abovementioned formula (2) at a temperature between 130° and 180° C., preferably 150° and 170° C., for a period of expediently ½ to 8 hours. Preferred amines of the formula (2) are aniline, m-toluidine, p-toluidine, m-anisidine, p-anisidine, 2-, 3- and 4-chloroaniline, nitroaniline and 2-, 3- and 4-bromoaniline. The polar, water-insoluble organic solvent can be partly or completely removed during or after this reaction, expediently by removal by distillation under reduced pressure. The distillation conditions should be chosen here such that the aromatic amine remains predominantly in the amine melt.

The reaction product thus obtained is a melt which is decomposed in the next step c) in the absence of a water-soluble solvent either with a preferably 5 to 80% strength by weight, particularly preferably 10 to 20% strength by weight, mineral acid, for example sulfuric acid, hydrochloric acid or phosphoric acid, in particular sulfuric acid, or with a preferably 10 to 50% strength by weight, particularly preferably 15 to 30% strength by weight, alkali metal hydroxide solution, for example sodium hydroxide solution or potassium hydroxide solution, preferably sodium hydroxide solution.

In the case of acid decomposition of the melt, the reaction is carried out at a temperature between 30° and 90° C., preferably 70° and 90° C., for a period of expediently 1 to 3 hours. The amount of mineral acid added is chosen here such that a pH of between 1 and 6 is established after decomposition of the amine melt.

In the case of basic decomposition of the amine melt, the reaction is preferably carried out at a temperature between 50° and 100° C., preferably 80° and 100° C., for a period of expediently 1 to 3 hours and in the presence of a viscosity-lowering additive. The amount of alkali metal hydroxide solution added is chosen here such that a pH of at least 9 is established during decomposition of the amine melt. The said additive is preferably an alkali metal salt of the condensation products from naphthalenesulfonic acid and formaldehyde or of copolymers of methacrylic acid and maleic anhydride, or an acetylenediol, and can be employed in amounts of 0.1 to 10% by weight, preferably 0.5 to 5% by weight, based on the weight of the triaminotriphenylmethane coloring agent. After acidification of the alkaline solution, preferably with sulfuric acid, the crude pigment or the dyestuff is then precipitated at a pH of between 1 and 6 directly or from the organic phase, which has been separated off and diluted with a water-soluble organic solvent. The water-soluble organic solvent used for the dilution is expediently employed in an amount of at least 200 parts per 70 parts yield of coloring agent.

The triphenylmethane pigment precipitates obtained after acid or alkaline decomposition are isolated by filtration and washing and, after known finishing methods described, for example, in DE-A-41 14 863, are further processed to suitable pigment preparations.

The triphenylmethane coloring agents prepared according to the invention meet the requirements imposed on a procedure which can be carried out industrially and on the quality of the coloring agent. They no longer exhibit the disadvantages, which occur in the previous processes, in the course of the process and in the quality compared with the previous aminosulfonic acid or aminosulfonic acid salt process. The process conditions mentioned under a) thus lead surprisingly to a considerable improvement in the viscosity and therefore the homogeneity and the degree of conversion of the reaction partners, which would otherwise be achievable only with a drastic increase in the amount of solvent, which would be several times the size of the batch. The final viscosity of the batch at a temperature of 130° C. is in a range from watery-liquid to honey-like at a degree of conversion of between 70 and 90% with homogeneous distribution of the sulfonation at the same time. A degree of sulfonation of 0.7 to 1.1 is achieved. If the conditions mentioned under a) are not established, the final viscosity at the same temperature is between highly pasty and virtually waxy, which leads to a content of sulfo groups of only 0.4 to 0.6, and in all cases to a very nonuniform "distribution of the sulfonation" with the disadvantages already described above.

In the following examples, "parts" are parts by weight.

EXAMPLE 1

28 parts of anhydrous sulfanilic acid sodium salt are added to the reaction suspension of the 4,4',4"-trichlorotritylaluminum tetrachloride prepared from 194 parts of chlorobenzene, 18 parts of aluminum(III) chloride and 30 parts of p-chlorobenzotrichloride, and, after application of a preliminary vacuum of 0.4 bar for 15 minutes, the mixture is stirred in a closed autoclave at 160° C. by means of a stirrer which distributes in the axial direction at a speed of 50 to 60 revolutions per minute for 3 hours. After the mixture has been cooled to below 130° C., the autoclave has been let down and 200 parts of m-toluidine have been added, the reaction batch is melted at 160° C. for 3 hours, under a vacuum of 0.4 bar towards the end, the excess chlorobenzene being distilled off completely. The melt is then decomposed with 480 parts of 10% strength by weight sulfuric acid at 80° C. for 1 hour. The crude pigment which has precipitated and has been filtered and washed free from salts (yield of 80 parts) is finally divided by alkaline recrystallization and processed to a greenish-tinged blue printing ink with a suitable varnish, as described, for example, in DE-A-41 14 863. The printing ink is suitable for brightening carbon black and, because of its purer color shade compared with a triphenylmethane pigment sulfonated with sulphuric acid, also for printing in blue.

EXAMPLE 2

A mixture of a 4,4',4''-trichlorotrityl tetrachloroaluminate suspension and anhydrous metanilic acid Na salt, as the sulfonic acid component, is reacted and the subsequent melt reaction with p-toluidine, as the aromatic amine, is carried out in the ratios of amounts and under the conditions according to Example 1.

The melt is then decomposed in a mixture of 33 parts of sodium hydroxide, 100 parts of water and 1 part of a sodium salt of a condensation product from naphthalene sulfonic acid and formaldehyde at 95° C. for 3 hours and the crude pigment is precipitated by addition of 10% strength by weight sulfuric acid to the organic phase, which has been separated off at 85° to 95° C., to a pH of between 1 and 6. The crude pigment, which is obtained in a yield of 80 parts, gives a printing ink with a greenish-tinged blue color shade and the suitability profile described above after the preparation described in Example 1.

EXAMPLE 3

The procedure is as in Example 2, a sodium salt of a copolymer of methacrylic acid and maleic anhydride or an acetylenediol being employed as the additive. A triphenylmethane pigment is obtained in the quality described in Example 2.

EXAMPLE 4

Pigments with similar properties to those described under Examples 1 and 2 are prepared in an analogous manner by using p-toluidine, 2-, 3- or 4-chloro-aniline, nitro-aniline, m- or p-anisidine or mixtures thereof.

EXAMPLE 5

The reaction mixture of 4,4',4''-trichlorotrityl tetrachloroaluminate and anhydrous sulfanilic acid Na salt obtained under Example 1 is melted with 20 parts of m-toluidine at 130° C. for 1 hour and then with a further 100 parts of aniline at 160° C. for 2 hours, a chlorobenzene/aniline mixture being distilled off at the same time. The reaction melt is first diluted with a further 50 parts of aniline and is then subjected to alkali decomposition in 200 parts of the water/sodium hydroxide/additive mixture described in Example 2 at 95° C. for 2 hours. Thereafter, a further 200 parts of water are added, the organic phase, which has been separated off at 85° to 95° C., is diluted with 300 parts of chlorobenzene and the crude pigment containing aniline sulfate is precipitated by slow addition of 90 parts of 30% strength by weight sulfuric acid. The precipitate, which has been filtered off and washed with chlorobenzene, is suspended in 500 parts of water, the excess chlorobenzene is driven off by steam distillation and the aniline sulfate is separated off by filtration and washing. Yield: 70 parts. With a preparation procedure carried out according to Example 1, a reddish-tinged blue printing ink of particularly deep tinctorial strength which is particularly suitable for brightening black printing ink is obtained.

EXAMPLE 6

28 parts of anhydrous sulfanilic acid sodium salt are added to the reaction suspension of the 4,4',4''-trichlorotritylaluminum tetrachloride prepared from 194 parts of chlorobenzene, 18 parts of aluminum(III) chloride and 30 parts of p-chlorobenzotrichloride, and, after application of a preliminary vacuum of 0.4 bar for 15 minutes, the mixture is stirred in a closed autoclave at 160° C. by means of a stirrer which distributes in the axial direction at a speed of 40 to 50 revolutions per minute for 3 hours.

The resulting reaction suspension is stirred with 200 parts of sodium hydroxide solution (33% strength by weight) and 1,000 parts of water at 95° C. for 3 hours. After separation of the phases and addition of a further 500 parts of water to the organic phase, this phase is acidified to pH 1 with sulfuric acid and the excess chlorobenzene is removed by steam distillation. The reaction product is isolated by filtration, washing and drying. The reaction product is a compound of the following formula, in which X is chlorine and Ar is phenylene (yield of 63 parts):

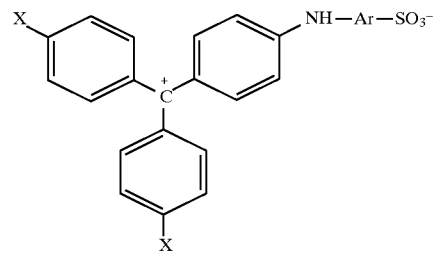

We claim:
1. A process for the preparation of a compound of the formula (I)

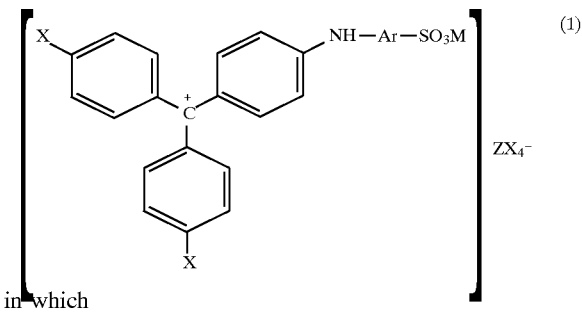

in which
X is halogen,
Z is iron, boron or aluminum,
M is an alkali metal or alkaline earth metal or an ammonium group and
Ar is a phenylene or naphthylene radical,
which comprises first reacting an iron, boron or aluminum trihalide complex compound of 4,4',4''- trihalotriphenylmethane halide with a salt of an aromatic aminosulfonic acid or a salt of an aminonaphthalene-sulfonic acid in a molar ratio of 0.6:1 to 1.4:1 at a temperature between 130° and 180° C., under a hydrogen halide partial pressure of at least 1 bar and in the presence of a polar, water-insoluble organic solvent and in the absence of a water-soluble organic solvent.

2. The process as claimed in claim 1, wherein
X is chlorine or bromine,
Z is iron or aluminum and
M is sodium or potassium.

3. The process as claimed in claim 1, wherein an iron- or aluminum-trichloro complex compound of a 4,4',4"-trichlorotriphenylmethane chloride is employed.

4. The process as claimed in claim 1, wherein an alkali metal salt of metanilic acid or of sulfanilic acid or of a β-naphthylamine-sulfonic acid is employed.

5. The process as claimed in claim 4, wherein the alkali metal salt is a sodium salt.

6. The process as claimed in claim 5, wherein the alkali metal salt of the said acids is free from water of crystallization.

7. The process as claimed in claim 1, wherein the reaction with the salt of the aromatic aminosulfonic acid is carried out in a closed system at a temperature between 150° and 170° C. and at the autogenous increased pressure.

8. The process as claimed in claim 1, wherein the reaction with the salt of the aromatic aminosulfonic acid is carried out while stirring at a speed of between 40 and 80 revolutions per minute.

9. A process for the preparation of a triaminotriphenylmethane coloring agent, which comprises
   a) first reacting an iron, boron or aluminum trihalide complex compound of a 4,4',4"- trihalotriphenylmethane halide with a salt of an aromatic aminosulfonic acid in a molar ratio of 0.6:1 to 1.4:1 at a temperature between 130° and 180° C., under a hydrogen halide partial pressure of at least 1 bar and in the presence of a polar, water-insoluble organic solvent, subsequently
   b) reacting the reaction suspension obtained according to a) with at least 5 molar equivalents of an aromatic amine of the formula (2)

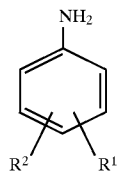

(2)

in which $R^1$ and $R^2$ are identical or different and are hydrogen, halogen, methyl, ethyl, nitro, methoxy or ethoxy, at a temperature between 130° and 180° C., subsequently
   c) either bringing the amine melt obtained according to b), in the absence of a water-soluble solvent, to a pH of between 1 and 6 by addition of a mineral acid or first bringing it to a pH of at least 9 with an alkali metal hydroxide solution in the presence of a viscosity-lowering additive, carrying out a phase separation, adding a water-insoluble organic solvent to the organic phase and then bringing this to a pH of between 1 and 6 by addition of a mineral acid, and finally a
   d) isolating the coloring agent precipitated according to c) in the customary manner.

10. The process as claimed in claim 9, wherein an iron- or aluminum-trichloro complex compound of a 4,4',4"-trichlorotriphenylmethane chloride is employed.

11. The process as claimed in claim 9, wherein an alkali metal salt of metanilic acid or of sulfanilic acid or of a β-naphthylamine-sulfonic acid is employed.

12. The process as claimed in claim 11, wherein the alkali metal salt of the said acids is free from water of crystallization.

13. The process as claimed in claim 9, wherein the reaction with the salt of the aromatic aminosulfonic acid is carried out in a closed system at a temperature between 150° and 170° C. and at the autogenous increased pressure.

14. The process as claimed in claim 9, wherein the reaction with the salt of the aromatic aminosulfonic acid is carried out while stirring at a speed of between 40 and 80 revolutions per minute.

15. The process as claimed in claim 9, wherein the aromatic amine of formula (2) is aniline, m-toluidine, p-toluidine, m-anisidine, p-anisidine, 2-, 3- or 4-chloroaniline, 2-, 3- or 4-bromoaniline or nitroaniline.

16. The process as claimed in claim 9, wherein the polar, water-insoluble organic solvent is partly or completely removed in the course of or after the end of reaction b).

17. The process as claimed in claim 9, wherein process step c) is carried out with 5 to 80% strength by weight sulfuric acid at a temperature between 30° and 90° C.

18. The process as claimed in claim 9, wherein process step c) is caried out with 10 to 50% strength by weight sodium hydroxide solution and in the presence of 1 to 10% by weight, based on the weight of the triaminotriphenylmethane coloring agent, of a viscosity-lowering additive.

19. The process as claimed in claim 18, wherein the viscosity-lowering additive is an alkali metal salt of a condensation product from naphthalenesulfonic acid and formaldehyde, an alkali metal salt of a copolymer of methacrylic acid and maleic anhydride, or an acetylenediol.

* * * * *